(12) United States Patent
Grey

(10) Patent No.: US 9,834,162 B1
(45) Date of Patent: Dec. 5, 2017

(54) TRUCK BUG DEFLECTOR

(71) Applicant: Melvin Grey, Ogden, UT (US)

(72) Inventor: Melvin Grey, Ogden, UT (US)

( * ) Notice: Subject to any disclaimer, the term of this patent is extended or adjusted under 35 U.S.C. 154(b) by 0 days.

(21) Appl. No.: 15/077,162

(22) Filed: Mar. 22, 2016

(51) Int. Cl.
*B60J 9/04* (2006.01)
*B60R 19/54* (2006.01)

(52) U.S. Cl.
CPC ................... *B60R 19/54* (2013.01)

(58) Field of Classification Search
CPC ... E04D 13/076; E04D 13/064; B01D 29/117; B01D 29/52; E04B 1/92; B62D 35/001; B62D 35/005; E01H 1/042; B60J 1/2005; B60J 7/085
USPC ........... 296/91, 180.1, 180.2, 180.3; 180/903
See application file for complete search history.

(56) References Cited

U.S. PATENT DOCUMENTS

| | | | | |
|---|---|---|---|---|
| 2,778,439 A * | 1/1957 | Pfingsten | ............... | B60J 1/2005 160/368.1 |
| 2,792,254 A * | 5/1957 | Hagglund | ............... | B60J 1/2005 180/68.6 |
| 2,793,705 A * | 5/1957 | Garrity | ............... | B60J 1/20 180/69.2 |
| 2,872,242 A * | 2/1959 | Whartman | ............... | B60J 1/2005 160/368.1 |
| 3,015,517 A * | 1/1962 | Thornburgh | ........... | B60J 1/2005 296/91 |
| 3,022,848 A * | 2/1962 | Heiser | ................... | B60J 1/2005 180/69.2 |
| 3,815,700 A * | 6/1974 | Mittendorf | ............ | B60J 1/2005 180/68.6 |
| 3,831,696 A * | 8/1974 | Mittendorf | ............ | B60J 1/2005 180/68.6 |
| 3,863,728 A * | 2/1975 | Mittendorf | ............ | B60K 11/04 180/68.6 |
| 3,987,863 A * | 10/1976 | Mittendorf | ............ | B60J 1/2005 180/68.6 |
| 4,040,498 A * | 8/1977 | Johnson | ................ | B60K 11/04 180/68.6 |
| 4,052,099 A * | 10/1977 | Lowery | ................. | B60J 1/2005 248/909 |
| 4,085,964 A * | 4/1978 | Hutto | ..................... | B60J 1/2005 180/68.6 |
| 4,159,845 A * | 7/1979 | Bratsberg | ............... | B60J 1/2005 296/91 |
| 4,178,034 A * | 12/1979 | Mittendorf | ............ | B60K 11/04 180/68.6 |
| 4,236,592 A * | 12/1980 | Ziegler | ................. | B60J 1/2005 180/68.6 |
| 4,364,596 A * | 12/1982 | Geisendorfer | ......... | B60J 1/2005 296/91 |

(Continued)

*Primary Examiner* — Kiran B Patel

(57) ABSTRACT

The truck bug deflector is a structure that is adapted for use with vehicles. The truck bug deflector comprises a primary shield and an auxiliary shield. The truck bug deflector is a structure that is attached to the front of a vehicle to protect the vehicle from damage caused by insects and debris that would otherwise hit the vehicle while the vehicle is in motion. The primary shield is adapted to be mounted on the grill guard of a vehicle and is designed to deflect insects and debris both away from the vehicle and away from the windshield of the vehicle. The auxiliary shield is adapted to be mounted to the grill guard of the vehicle and is designed to protect the lower portions of the vehicle from insects and debris.

1 Claim, 5 Drawing Sheets

(56) References Cited

U.S. PATENT DOCUMENTS

| | | | | |
|---|---|---|---|---|
| 4,471,991 A | * | 9/1984 | Matthias | B60J 1/2005 180/68.6 |
| 4,518,191 A | * | 5/1985 | Williams | B60J 1/2005 16/225 |
| 4,547,013 A | * | 10/1985 | McDaniel | B60J 1/2005 180/68.1 |
| 4,621,860 A | * | 11/1986 | Gerst | B60J 1/2005 296/91 |
| 4,627,657 A | * | 12/1986 | Daniels | B60J 1/2005 180/68.6 |
| 4,776,627 A | * | 10/1988 | Hutto | B60K 11/08 180/68.6 |
| 4,836,598 A | * | 6/1989 | Mastin | B60K 11/08 180/68.6 |
| 4,840,418 A | * | 6/1989 | Bockenheuser | B60J 1/2005 296/78.1 |
| 4,846,522 A | * | 7/1989 | Bonstead | B60J 1/2005 296/180.2 |
| 4,929,013 A | * | 5/1990 | Eke | B60J 1/20 296/180.5 |
| 5,112,095 A | * | 5/1992 | Lund | B62D 35/005 296/180.5 |
| 5,234,247 A | * | 8/1993 | Pacer | B60J 1/20 296/91 |
| 5,280,386 A | * | 1/1994 | Johnson | B60J 1/2005 296/180.1 |
| 5,308,134 A | * | 5/1994 | Stanesic | B60J 1/2005 296/180.1 |
| 5,348,363 A | * | 9/1994 | Fink | B60J 1/2005 180/69.23 |
| 5,403,059 A | * | 4/1995 | Turner | B62D 35/005 296/180.1 |
| 5,562,323 A | | 10/1996 | Wildermuth | |
| 5,762,374 A | * | 6/1998 | Grove | B60D 1/60 280/493 |
| 5,791,719 A | * | 8/1998 | Alley | B60J 1/2005 24/295 |
| 6,547,305 B1 | * | 4/2003 | Ellis | B60J 1/2005 296/91 |
| 6,547,306 B2 | * | 4/2003 | Espinose | B62D 35/005 206/494 |
| 6,926,346 B1 | * | 8/2005 | Wong | B62D 35/001 296/180.1 |
| 7,344,183 B2 | * | 3/2008 | Brash | B60J 1/2005 296/180.1 |

* cited by examiner

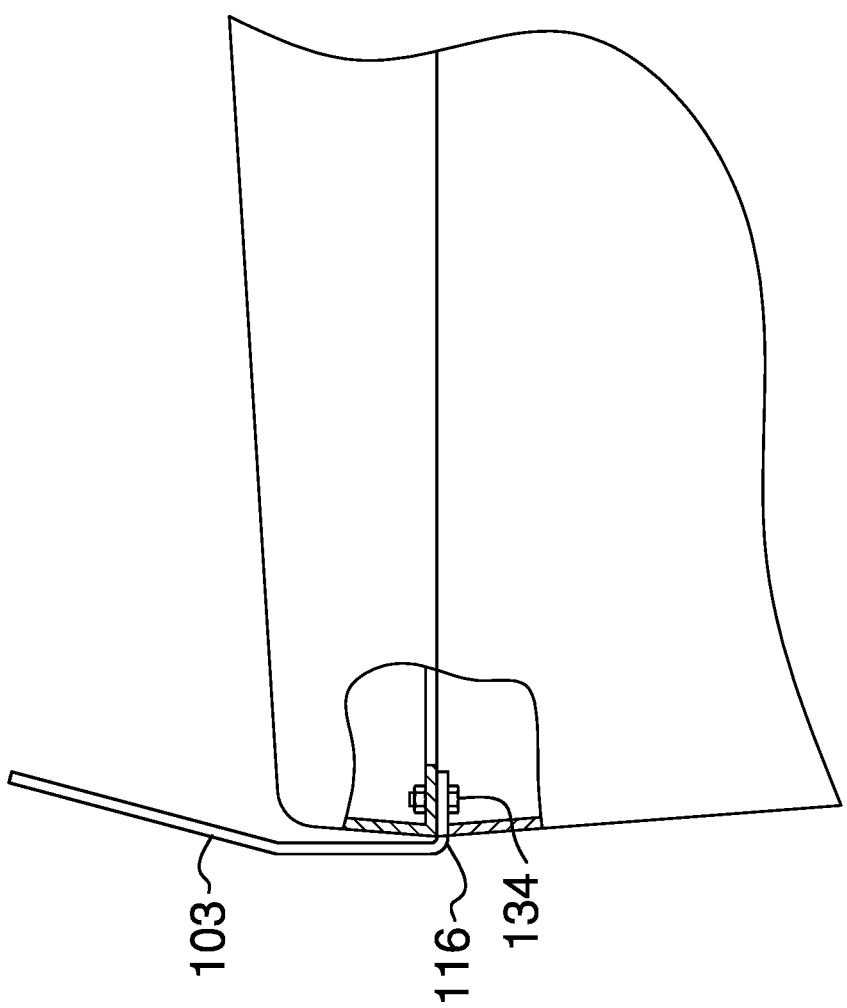

TRUCK BUG DEFLECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of windows, windscreens and accessories thereof, more specifically, a bug and rock guard adapted for use with vehicles.

SUMMARY OF INVENTION

The truck bug deflector is a structure that is adapted for use with vehicles. The truck bug deflector is a structure that is attached to the front of a vehicle to protect the vehicle from damage caused by insects and debris, including but not limited to rocks, which would otherwise hit the vehicle while the vehicle is in motion. The primary shield is adapted to be mounted on the grill guard of a vehicle and is designed to deflect insects and debris both away from the vehicle and away from the windshield of the vehicle. The auxiliary shield is adapted to be mounted to the grill guard of the vehicle and is designed to protect the lower/radiator portions of the vehicle from insects and debris.

These together with additional objects, features and advantages of the truck bug deflector will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck bug deflector in detail, it is to be understood that the truck bug deflector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck bug deflector.

It is therefore important that the claims be regarded as including such equivalent construction insofar as they do not depart from the spirit and scope of the truck bug deflector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 7 is a side view of the alternative embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
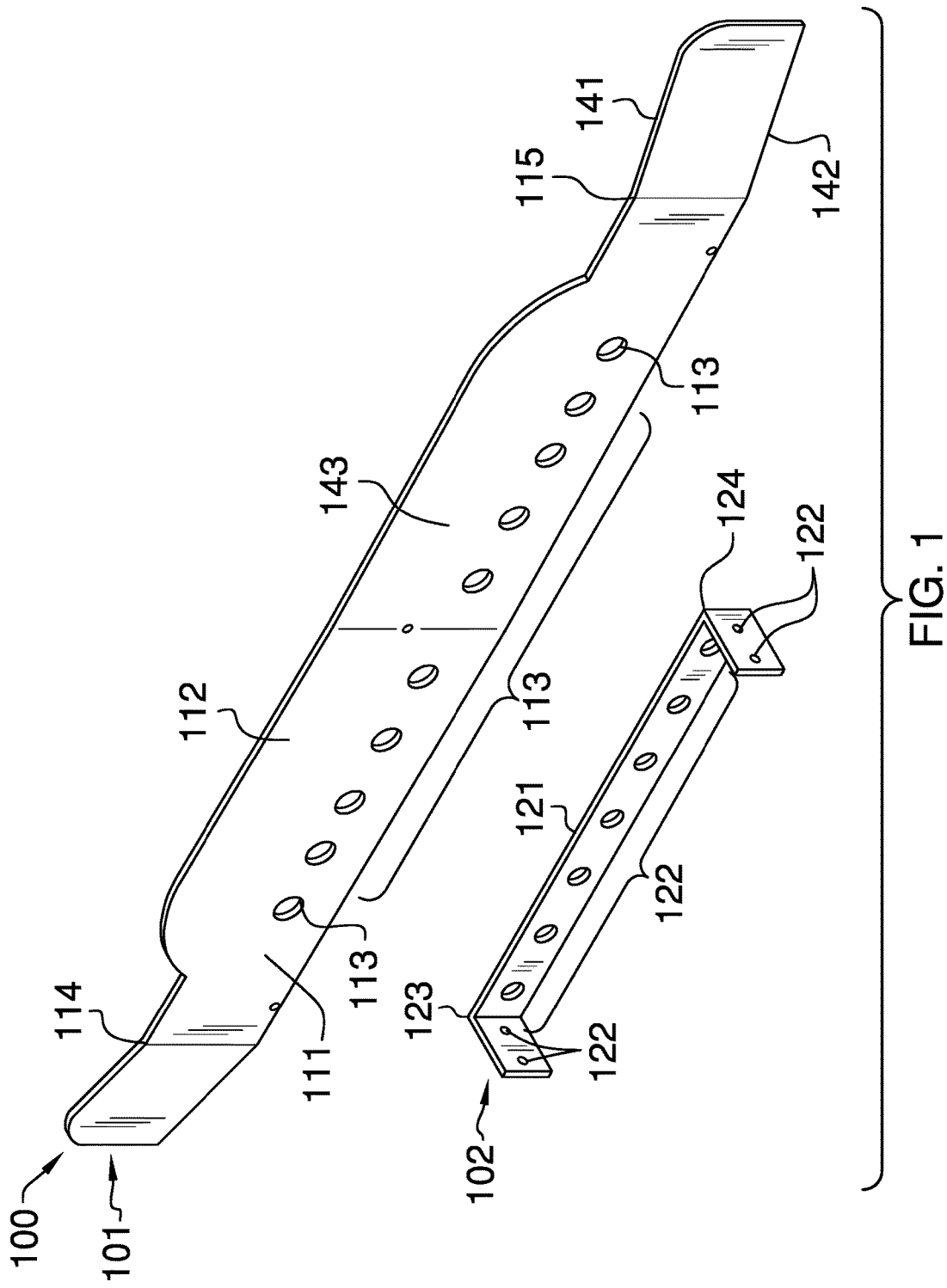
FIG. 1 is a perspective view of an embodiment of the disclosure.
Figure 2:
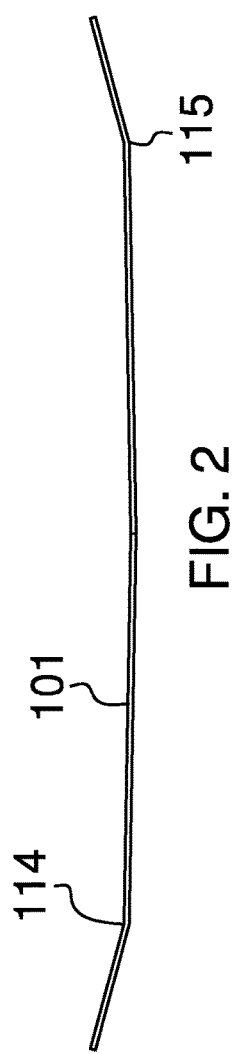
FIG. 2 is a top view of an embodiment of the disclosure.
Figure 3:
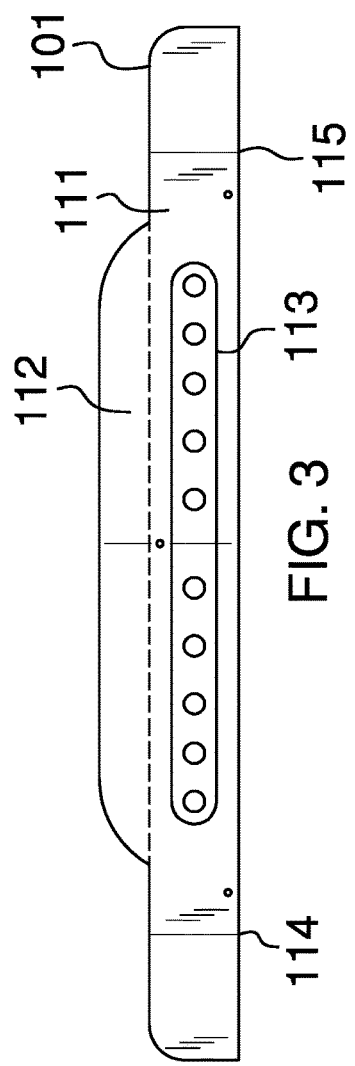
FIG. 3 is a detail view of an embodiment of the disclosure.
Figure 4:
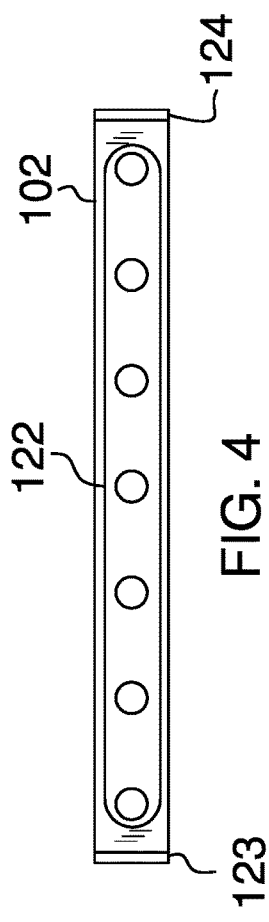
FIG. 4 is a detail view of an embodiment of the disclosure.
Figure 5:
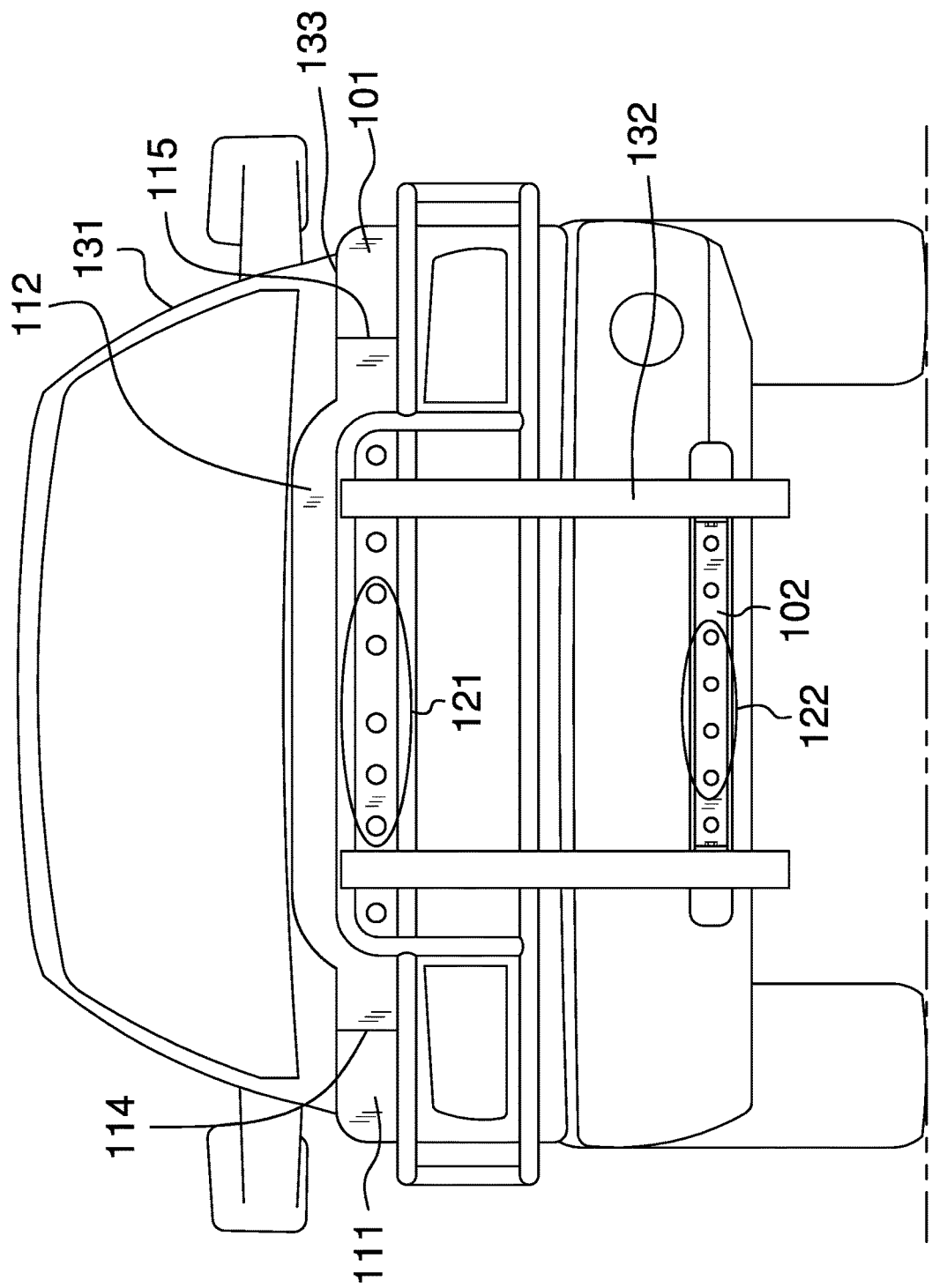
FIG. 5 is an in use view of an embodiment of the disclosure.
Figure 6:
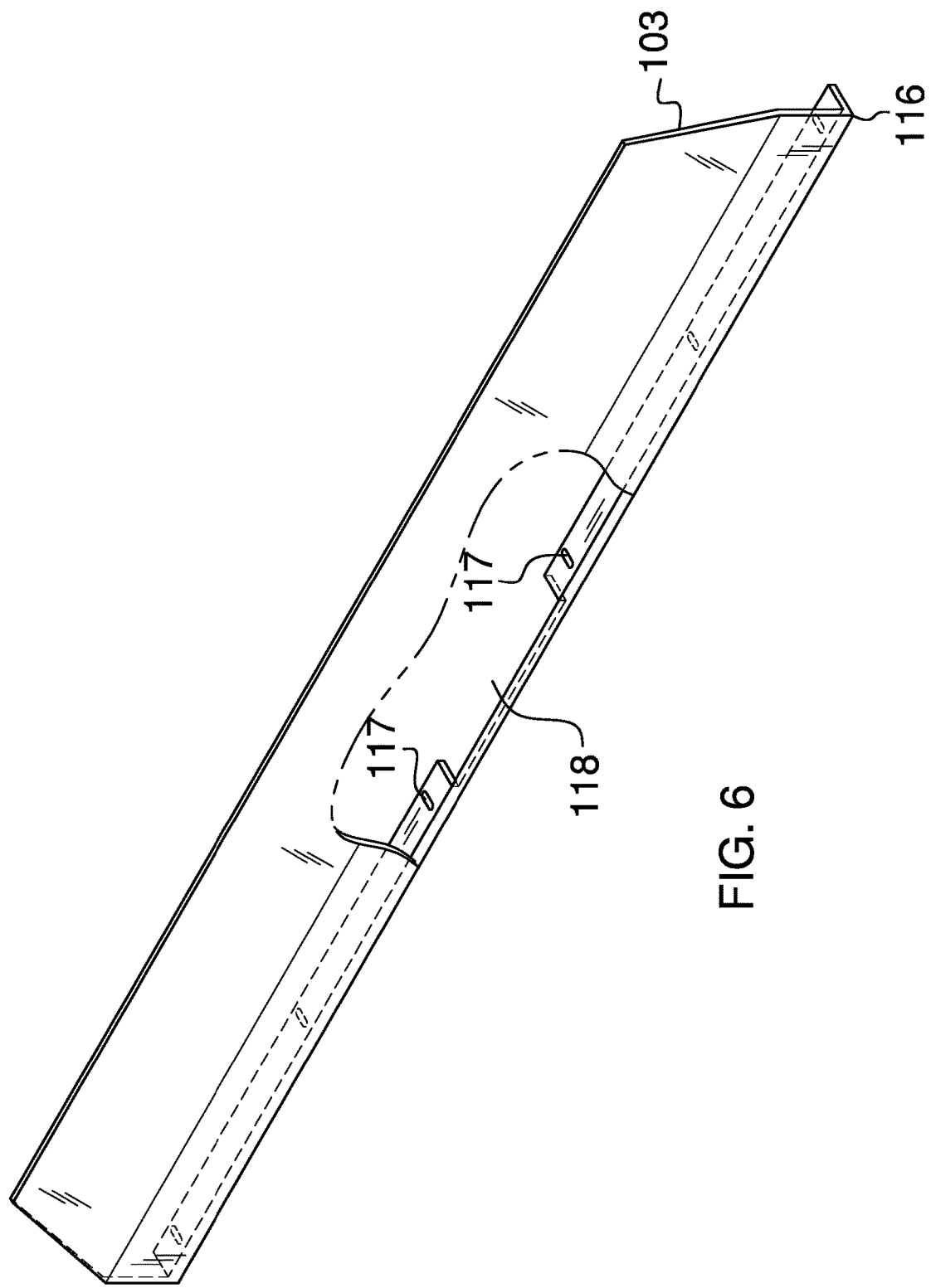
FIG. 6 is a perspective view of an alternative embodiment of the disclosure.

Detailed reference will now be made to a plurality of potential embodiments of the disclosure, which are illustrated in FIGS. 1 through 7.

The truck bug deflector comprises a primary shield 101 and an auxiliary shield 102. The truck bug deflector 100 (hereinafter invention) is a structure that is adapted for use with vehicles 131. The invention 100 is a structure that is attached to the front of a vehicle 131 to protect the vehicle 131 from damage caused by insects and debris that would otherwise hit the vehicle 131 while the vehicle 131 is in motion. The primary shield 101 is adapted to be mounted on the grill guard 132 of a vehicle 131 and is designed to deflect insects and debris both away from the vehicle 131 and away from the windshield of the vehicle 131. The auxiliary shield 102 is adapted to be mounted to the grill guard 132 of the vehicle 131 and is designed to protect the lower/radiator portions of the vehicle 131 from insects and debris.

In the first potential embodiment of the disclosure, the primary shield 101 is a structure that is formed as a single unit from diamond plate metal. While it is understood that the primary shield 101 is formed as a single integrated unit, the primary shield 101 is more readily understood when it is discussed as collection of separate components that are attached to each other and this is the approach that will be taken in this disclosure. Those skilled in the art will be able to produce the primary shield 101 as a single integrated unit from this disclosure with a minimum of modification and experimentation. The primary shield 101 further comprises a master panel 111, a center projection 112, a first plurality of mounting holes 113, a first bend 114, and a second bend 115. The master panel 111 is a rectangular structure formed from the diamond metal plate.

It shall be noted that the invention 100 may be manufactured with more of the plurality of mounting holes 113 than is required for actual mounting purposes. The plurality of mounting holes 113 is able to be used for venting purposes.

The master panel 111 is further defined with a top edge 141 and a bottom edge 142. The top edge 141 is the edge of the master panel 111 that is distal from the ground when the invention 100 is properly installed. The master panel 111 is further formed with the first bend 114 and the second bend 115. The first bend 114 is a first angle that is formed in the master panel 111 to match the contour of the hood 133 of the vehicle 131 such that when the master panel 111 is attached to the grill guard 132.

The second bend 115 is a second angle that is formed in the master panel 111 to match the contour of the hood 133 of the vehicle 131 such that when the master panel 111 is attached to the grill guard 132. The second bend 115 is a mirror image of the first bend 114 when viewed along the centerline of the vehicle 131. The center projection 112 is a projection that extends the surface 143 of the master panel 111 from the top edge 141 in a direction away from the bottom edge 142. The projection of the center projection 112 occurs between the first bend 114 and the second bend 115. While the shape of the center projection 112 can take any shape, in the first potential embodiment of the disclosure, the center projection 112 is roughly in the shape of a half oval. The master panel 111 is formed with the first plurality of mounting holes 113. The first plurality of mounting holes 113 are located within the master panel 111 to match the location of mounting holes that are formed in the grill guard 132. The primary shield 101 is attached to the grill guard 132 using commercially available hardware.

In the first potential embodiment of the disclosure, the auxiliary shield 102 is a structure that is formed as a single unit from diamond plate metal. While it is understood that the auxiliary shield 102 is formed as a single integrated unit, the auxiliary shield 102 is more readily understood when it is discussed as collection of separate components that are attached to each other and this is the approach that will be taken in this disclosure. Those skilled in the art will be able to produce the auxiliary shield 102 as a single integrated unit from this disclosure with a minimum of modification and experimentation. The auxiliary shield 102 further comprises an auxiliary panel 121, a second plurality of mounting holes 122, a third bend 123, and a fourth bend 124. The auxiliary panel 121 is a rectangular structure formed from diamond metal plate.

The auxiliary panel 121 is further formed with the third bend 123 and the fourth bend 124. The third bend 123 is a right angle bend that is located to wrap the auxiliary shield 102 around the grill guard 132. The fourth bend 124 is a right angle bend that is located to wrap the auxiliary shield 102 around the grill guard 132. The fourth bend 124 is a mirror image of the third bend 123 when viewed along the centerline of the vehicle 131. The auxiliary panel 121 is further formed with the second plurality of mounting holes 122. The second plurality of mounting holes 122 are located within the master panel 111 to match the location of mounting holes that are formed in the grill guard 132. The auxiliary shield 102 is attached to the grill guard 132 using commercially available hardware.

In the second potential embodiment of the disclosure, the primary shield 101 is replaced with an alternative shield 103. The alternative shield 103 is identical to the primary shield with the exceptions that a fifth bend 116 is added to the primary shield 101 and the first plurality of mounting holes 113 are replaced with a plurality of mounting slots 117. The fifth bend 116 is a right angle bend that is formed in the bottom edge 142 of the master panel 111. A gap 118 is formed in the fifth bend 116 to create space for the hood latch mechanism 134 of the vehicle 131. A plurality of mounting slots 117 are formed in the fifth bend 116. The plurality of mounting slots 117 are positioned to correspond to the location of the catch brackets of the hood latch mechanism 134 of the vehicle 131.

To install the alternative shield 103 on the vehicle 131, the hood 133 of the vehicle 131 is opened and the plurality of mounting slots 117 is positioned to avoid the catch brackets of the hood mechanism. Once the alternative shield 103 is positioned, holes are drilled in the lip of the hood corresponding to the plurality of mounting slots 117, and commercially available hardware is used to hold the alternative shield 103 in position. In the second potential embodiment of the disclosure, the auxiliary shield 102 remains unchanged.

Once the invention 100 is installed on a vehicle 131, the vehicle 131 may be driven normally.

The primary shield 101, the auxiliary shield 102, and the alternative shield 103 are each individually formed as a single unit from diamond plate metal. Any remaining hardware required to attach the primary shield 101, the auxiliary shield 102, and the alternative shield 103 are readily and commercially available.

The following definition was used in this disclosure:

Automobile: As used in this disclosure, a vehicle is a device that is used transporting carrying passengers, goods, or equipment over a network of roads and that is powered by an internal combustion engine. This definition is specifically intended to include vehicles commonly referred to as pickup trucks.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bug and debris deflector comprising:
   a primary shield and an auxiliary shield;
   wherein the debris deflector is adapted for use with a vehicle;
   wherein the debris deflector is a structure that is attached to the front of a vehicle;
   wherein the debris deflector to protects the vehicle from damage caused by insects and debris that would otherwise hit the vehicle while the vehicle is in motion;
   wherein the primary shield is adapted to be mounted on a grill guard of said vehicle;
   wherein the auxiliary shield is adapted to be mounted to the grill guard of the vehicle;
   wherein the primary shield is a structure that is formed from diamond plate metal;

wherein the auxiliary shield is a structure that is formed from diamond plate metal;

wherein the primary shield primary shield further comprises a master panel, a center projection, a first plurality of mounting holes, a first bend, and a second bend;

wherein the master panel is a rectangular structure;

wherein the master panel is further defined with a top edge and a bottom edge;

wherein the master panel is further formed with the first bend and the second bend;

wherein the second bend is a mirror image of the first bend;

wherein the center projection is a projection that extends the surface of the master panel from the top edge in a direction away from the bottom edge;

wherein the auxiliary shield further comprises an auxiliary panel, a second plurality of mounting holes, a third bend, and a fourth bend;

wherein the auxiliary panel is further formed with the third bend and the fourth bend;

wherein the fourth bend is a mirror image of the third bend.

* * * * *